March 24, 1931.  M. EINSTEIN  1,797,763
MACHINE FOR THE MECHANICAL EXTRACTION OF BAST FROM STALKS
OF PLANTS, SUCH AS RAMIE, JUTE, AND MALLOWS
Filed May 3, 1929
Fig.1
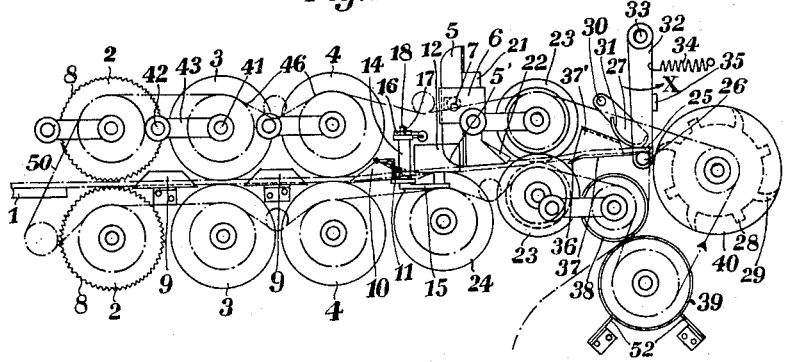
Fig. 2
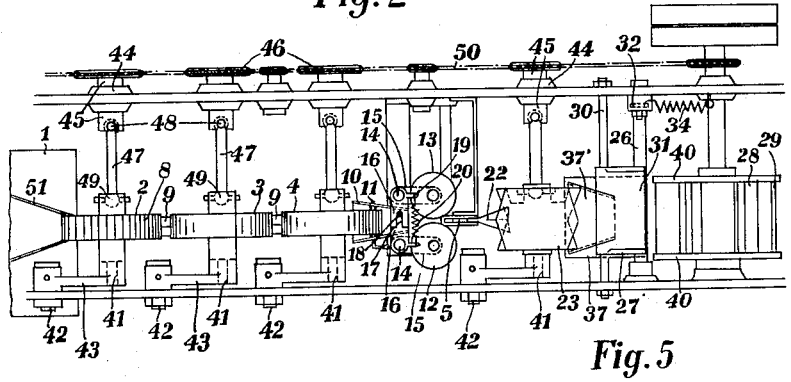
Fig. 3
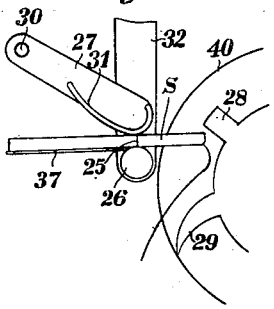
Fig. 4
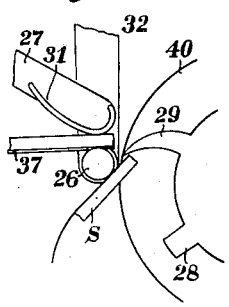
Fig. 5
Fig. 6
Inventor
Max Einstein
By Knight Bro
Attorneys Patented Mar. 24, 1931

1,797,763

UNITED STATES PATENT OFFICE

MAX EINSTEIN, OF HAMBURG, GERMANY, ASSIGNOR TO NAAMLOOZE VENNOOTSCHAP "DELTA" MAATSCHAPPIJ VOOR COMMERCIEELE EN INDUSTRIEELE FINANCIERING, SOCIÉTÉ DE CRÉDIT COMMERCIAL ET INDUSTRIEL, OF AMSTERDAM, NETHERLANDS

MACHINE FOR THE MECHANICAL EXTRACTION OF BAST FROM STALKS OF PLANTS, SUCH AS RAMIE, JUTE, AND MALLOWS

Application filed May 3, 1929, Serial No. 360,228, and in Germany May 9, 1928.

This invention relates to machines for mechanically obtaining bast from stalks of plants such as ramie and similar bast containing plants. By known machines of this kind the stalks are split, and the spread out stalk halves are intermittently broken off and separated from the bast, the loosened pieces of wood or pith being removed singly by means of scrapers. The known machines have substantial drawbacks, especially as regards perfect continuous feeding of the stalks, detachment of the woody portions and protection of the bast. With the known machines it is not feasible to split the stalks in the central plane and to spread them out on account of their varying thicknesses, and for that reason, more particularly at the high speed of revolution at which such machines must work, there is extreme probability of damage being done to the bast by the breaking tools at the inner side, where the finest and most valuable fibres are situated. Owing to the irregular breaking, the fibres are liable to be crushed and partly broken and incompletely freed from the woody parts of the stalk. The object of the invention is to eliminate the said drawbacks.

According to the invention the split and spread out stalks to be broken are guided at the top and at the bottom, with continuous advance, up to a point close in front of the breaking point and then treated by tools of different kinds successively coming into action, one tool breaking off a piece of stalk, the next one detaches the broken-off woody part from the bast, without the tools coming in contact with the bast itself. With a perfect centering and guiding of the stalks is obtained a uniform feed or advance, the mechanism effecting which action is positively connected with the device moving the breaking tools, so that a perfect removal of the woody parts is ensured, with the greatest possible protection for the bast. The bast is continuously carried away or discharged. The continuous feed is preferably effected by means of one or more feed and guide rollers which drive the stalk towards the tool intended for splitting and spreading out the stalk. The feed rollers as well as the breakers and strippers are preferably connected together in a positive manner, so that in spite of the continuous feed or advance, a clean separation of the wood from the stalk takes place and jamming or other unfavourable conditions, for instance temporary bending sideways, or bending upwards of the stalks are avoided.

In order that the said invention may be clearly understood and readily carried into effect, the same will now be more fully described with reference to the accompanying drawings exemplifying the arrangement of a machine for carrying out the invention.

Figure 1 represents the machine diagrammatically in side elevation,

Figure 2 is a plan of the same,

Figures 3 and 4 illustrate on an enlarged scale successive phases of the action of the breaking and stripping drum, Figure 5 is a side elevation of the operative part of the device for splitting and spreading out the stalks, and Figure 6 shows the same in perspective viewed from the back.

The stalks to be treated are fed to the table 1, whence they pass between the pairs of rollers 2, 3, 4 which drive the stalks against a knife 5. In the construction illustrated, this knife is vertically adjustable and provided with a cutting edge 5' (Figure 5) bent rearwards. The setting of the knife 5 in the guide 6 can be effected by means of a clamping screw 7 or by means of an eccentric or the like. A disc knife might alternatively be employed. During the continuous advance of the stalk, the knife 5 splits it completely.

One of the two pairs of the rollers 2, 3, 4 are preferably provided with flutings 8 and are used as the feed rollers, whilst the other rollers act only as guides. Between the pairs of rollers are also arranged guides 9 for the stalks, which guides 9 may be adjustable. Behind the last pair of rollers 4 is arranged a funnel guide 10 which is provided with a weighted or spring-controlled cover 11, its object being to supply the stalks to a centering device constituted by two rollers 12, 13, (Figure 2) and at the same time to keep them down. The rollers 12, 13 guide the stalks which are of varying thickness and usually also curved in different ways, to the cutter disc 5'.

The two guide rollers 12, 13 are mounted in bell crank levers 15 rotatable about the pins 14, the free arms 16 of which are positively connected together by a guide pin 18 movable in a guide slot 17. In order to ensure a perfect guiding of the stalk between the rollers 12, 13, the bell crank levers may comprise sleeves rotatable about the pins 14, the said sleeves carrying the arms 15 at the bottom and the free arms 16 at the top. The bell crank levers 15 and therefore the guide rollers 12, 13 are pressed against each other by a tension spring 20 secured to lugs 19, owing to which an exact centering of the passing stalk is ensured. Under the centering device, the stalk is guided by another separately driven guide roller 24.

Behind the knife 5 is arranged a spreading out device. As shown on an enlarged scale in Figures 5 and 6, it is constituted by a bridge 21 which adjoins the knife and on which are provided at the bottom spreading out surfaces 22, which latter produce a spreading out of the split stalk. The latter is then fed to the guide rollers 23 which are made V-shaped or oppositely inclined from their centres to their edges as seen in Figure 2. The pair of rollers 23 is used at the same time for guiding and for conveying the spread out stalks to the breaking point. The guide track for the stalks preferably rises from the cutting device towards the breaking point, in order to bring the stalk into the most favourable position possible for treatment by the breaking tools and stripping tools.

In order to ensure at the breaking point a reliable perfect breaking taking place as far as possible transversely of the direction of movement of the stalks, the stalk to be broken is further guided at the top and at the bottom, close in front of the breaking point, by guide devices 26, 27 and treated here by the breaking tools 28 and strippers 29 which closely follow one another and are at different distances from the breaking point. The strippers 29 are at such a distance from the breaking edge constituted by the lower guide 26 that, after the breaking off of a piece of wood s by the shorter breaker 28 (Figures 3 and 4), they cannot touch and therefore cannot injure the bast (see Figure 4).

It is important to provide above the lower guide device 26 which may be a rotatable roller, a movable weighted or spring controlled guide device 27 which may comprise a guide plate 31 pivoted about the pin 30 and made in the form of an arc of a circle. This plate extends to a point close above the breaking point 25 and limits the breaking point in front, that is to say in the direction of the advanced stalk, in such a manner that a transverse breaking of the woody part of the stalk is effected just at this point, that is to say an unfavourable breaking of the wood, which might lead to damage of the bast, is avoided.

In order to reduce the pressure on the bast when treating thick pieces of stalk, which of course require more space between the guide and the breaking and stripping tools, the bottom guide 26 constituting the breaking edge, is yieldingly mounted. In the construction illustrated, it is mounted on levers 32 which are rotatable about pins 33 (Figure 1). The levers 32 are controlled by the action of tension springs 34. The turning of the levers 32 in the direction of the arrow $x$ is limited by the stop 35, so that even when treating thin stalks, no contact of the strippers 29 with the bast can take place.

Under and in front of the guide 26 is provided a guide plate 37 preferably cranked downwards at the front edge 36. The plate 37 is also adjustable with the guide 26 and is mounted for instance on the rocking lever 32. Also above the said guide plate 37 are preferably provided separate guide walls 37' for the stalks, which depress the stalks rising after their passage between the rollers 23, so that the said stalks reach the breaking point in correct position.

The discharge of the bast can be effected by a pair of rollers 38, 39 which may also be driven in a positive manner.

As seen in Figures 1, 3 and 4, the breaking tools 28 and the strippers 29 are constituted by rigid ledges or bars of different heights which are mounted on a rotating device, for instance on a drum 40 or on an endless band or the like.

All the upper rollers of the pairs of rollers 2, 3, 4, 23 and the guide rollers 38 are mounted at one end with their journals 41 (Figure 2) in weighted or spring-controlled levers 43 rotatable about pins 42, so that they can yield in accordance with the thickness of the stalks passed between the rollers. The driving of the feed and guide rollers 2, 3, 4 and 23 is effected by means of spindles 45 supported in fixed bearings 44, which carry chain wheels 46 and to which the intermediate spindles 47 of the feed rollers 2, 3, 4 are coupled by means of universal joints 48, 49 such as ball or cardan joints.

For the purpose of ensuring a continuous advance of the stalks, the feed and guide roller pairs 2, 3, 4 as well as the pair of rollers 23, the pair of discharge rollers 38, 39 for the bast and the drum 40 carrying the breaking and stripping tools, are positively driven by means of chains 50 passing over chain wheels 46. The ratio between the pairs of rollers 2, 3, 4 and the pair of rollers 23 as well as the drum 40 is calculated so that by a suitable choice of the diameter of the chain wheels 46, in spite of the continuous advance of the stalks towards the breaking and stripping drum, there will take place a clean stripping of the wood from the stalks, without any possibility of damage to the bast by the strippers or by a jamming of the material or owing to other unfavourable conditions such as bending sideways, bending upwards, getting astray, crushing or the like.

A separate feed hopper 51 may be provided on the table 1.

On the bast discharge roller 39 are preferably provided separate strippers 52 which carry away any wood that remains hanging, and clean the discharge roller 39. This also prevents the bast from remaining suspended on the roller 39.

What I claim is:

1. A machine for mechanical extraction of basts from stalks of plants comprising a breaking edge, driven stripping means adjacent said breaking edge, breaking members and stripping members mounted on said stripping means for breaking and stripping the woody portion from the bast of the stalk, feeding means for feeding a stalk to said breaking edge and means for leading the separated bast away from said breaking edge in a direction away from said stripping means.

2. A machine as specified in claim 1 including a clamping means adjacent said breaking edge, said clamping means being adapted to clamp the stalks to the breaking edge.

3. A machine as specified in claim 1 including a splitting knife, said feeding means comprising, means for feeding and guiding the stalks to said splitting knife and means for guiding said stalks from said splitting knife to the breaking edge.

4. A machine as specified in claim 1 including a splitting knife, said feeding means including, feeding means for feeding and guiding the stalks to said splitting knife, and guiding means for guiding the stalks to the breaking edge, said stripping means, means for feeding, guiding means and means for leading the bast away being positively connected, and driving means, said driving means driving said members so positively connected.

5. A machine as specified in claim 1, including a splitting knife, said feeding means comprising, rollers for feeding the stalks to said splitting knife, additional guide rollers for guiding said stalks to said splitting knife and rollers for guiding said stalks from said splitting knife to said breaking edge, each of said rollers being yieldably mounted whereby they exert a light pressure on said stalks.

6. A machine as specified in claim 1, in which said breaking edge is yieldably mounted.

7. A machine as specified in claim 1, in which said breaking edge is formed by a roller, and in which is provided a pivoted lever, said roller being mounted in the free end of said lever.

8. A machine as specified in claim 1, in which is provided a weighted clamping device pivotally mounted above said breaking edge.

9. A machine as specified in claim 1, in which is provided a guide plate cranked at the front edge, said guiding plate being adjustably mounted with respect to said breaking edge below and in front of said breaking edge.

10. In a machine for mechanical extraction of bast from stalks of plants, a splitting knife, means for feeding a stalk to said splitting knife, a centering device immediately in front of said splitting knife, said centering device comprising two movable members and means for resiliently urging said members towards each other.

11. In a machine for mechanical extraction of bast from stalks of plants, a splitting and spreading member comprising a stationary spreading member and a detachable splitting member adjustably mounted in a vertical direction with respect to said spreading member.

12. In a machine for mechanical extraction of bast from stalks of plants, a splitting knife, means for feeding the stalk to said splitting knife, a centering device immediately preceding said splitting knife, and comprising two guide rollers, two rotatable bell crank levers in which said guide rollers are mounted, the free ends of said levers carrying respectively a guide slot and a pin, said pin engaging in said guide slot.

13. A machine for mechanical extraction of bast from stalks of plants comprising a breaking edge, driven stripping means adjacent said breaking edge, breaking members and stripping members mounted on said stripping means for breaking and stripping the woody portion from the bast of the stalk, feeding means for feeding a stalk to said breaking edge and means for preventing the separated bast from coming in contact with said stripping means after said separated bast leaves said breaking edge.

14. In a machine for mechanical extraction of bast from stalks of plants, a breaking and stripping member comprising a rotating member, stripping means and relatively shorter breaking means on said rotating member, said stripping means each including a knife edge at the extremity of said stripping means, each of said stripping means being set at an angle to a radius of said rotating member so that said knife edge points in the same direction as the rotation of said rotating member.

MAX EINSTEIN.